Sept. 2, 1947. R. R. WATERMAN 2,426,909
TRAP CONTROLLED FEED WATER SYSTEM FOR BOILERS
Filed Aug. 5, 1944 2 Sheets-Sheet 1

Inventor
R. R. Waterman
By
Attorneys

Sept. 2, 1947.      R. R. WATERMAN      2,426,909
TRAP CONTROLLED FEED WATER SYSTEM FOR BOILERS
Filed Aug. 5, 1944      2 Sheets-Sheet 2

Inventor
R. R. Waterman
By Webster & Webster
Attorneys

Patented Sept. 2, 1947

2,426,909

UNITED STATES PATENT OFFICE 2,426,909

TRAP CONTROLLED FEED-WATER SYSTEM FOR BOILERS

Russell R. Waterman, Lodi, Calif.

Application August 5, 1944, Serial No. 548,224

2 Claims. (Cl. 122—451)

1

This invention relates to water feeding means for steam boilers or generators, my principal object being to provide a steam trap control apparatus or system readily applicable to any conventional or other type of boiler or steam generator, by means of which the feeding of the water to the boiler will be automatically controlled by the functioning of the trap and as determined by the water level in the boiler.

A further object is to provide an apparatus for the purpose which may be readily adapted to control the operation of any type of water feed pump or other device, whether operated by steam, electric motor, or other power.

A further object of the invention is to provide a simple and inexpensive apparatus, and yet one which will be exceedingly effective for the purpose for which it is designed.

These objects I accomplish by means of such structure and relative arrangement of parts as will fully appear by a perusal of the following specification and claims.

In the drawings similar characters of reference indicate corresponding parts in the several views.

Figure 1:
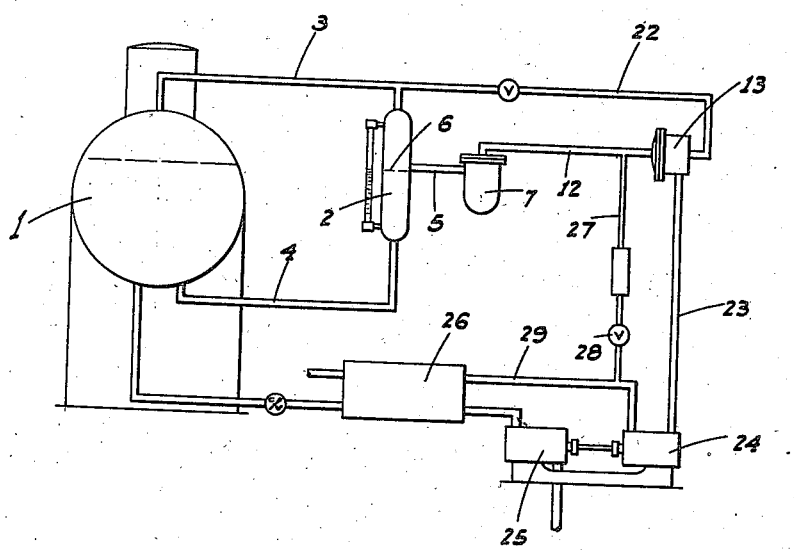
Figure 1 is a diagram of my improved water feed system as applied to a conventional boiler.
Figure 2:
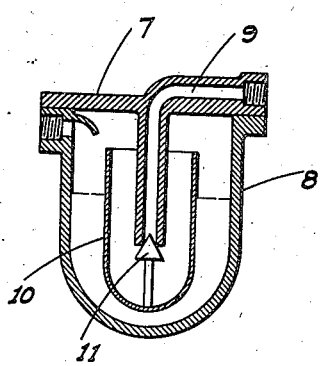
Figure 2 is a sectional elevation of one form of steam trap.
Figure 3:
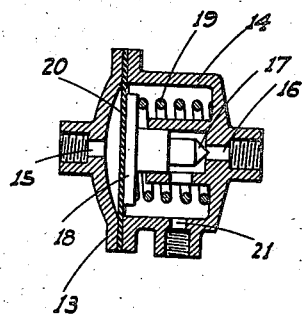
Figure 3 is a similar view of one form of pressure control valve used in the system.
Figure 4:
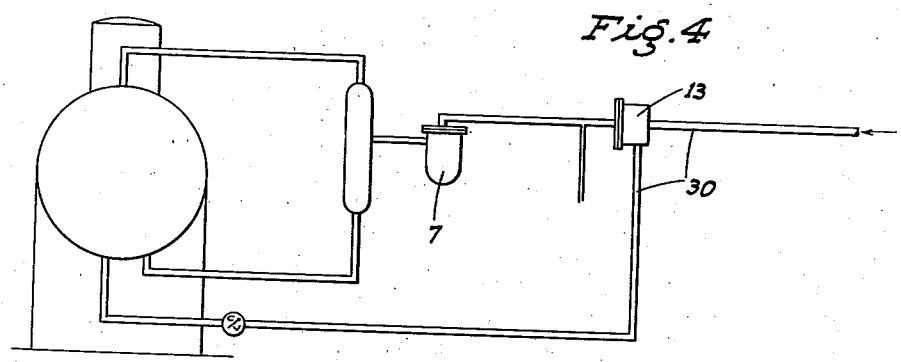
Figure 5:
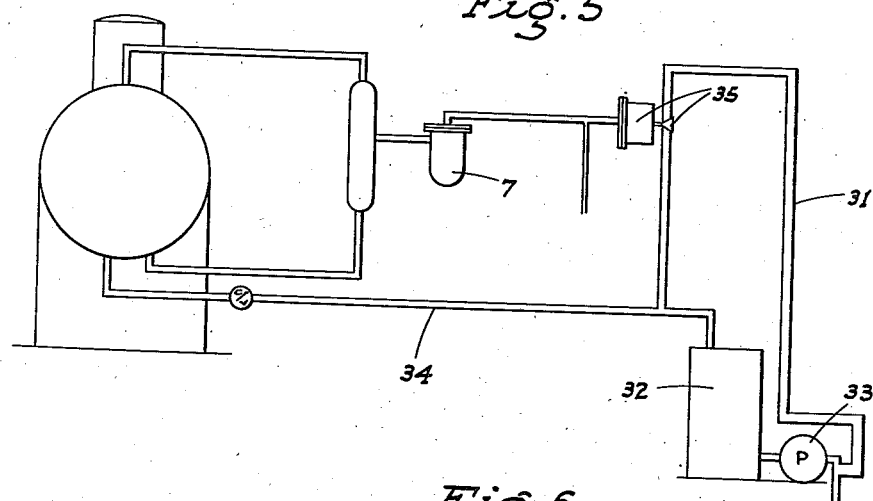
Figure 6:
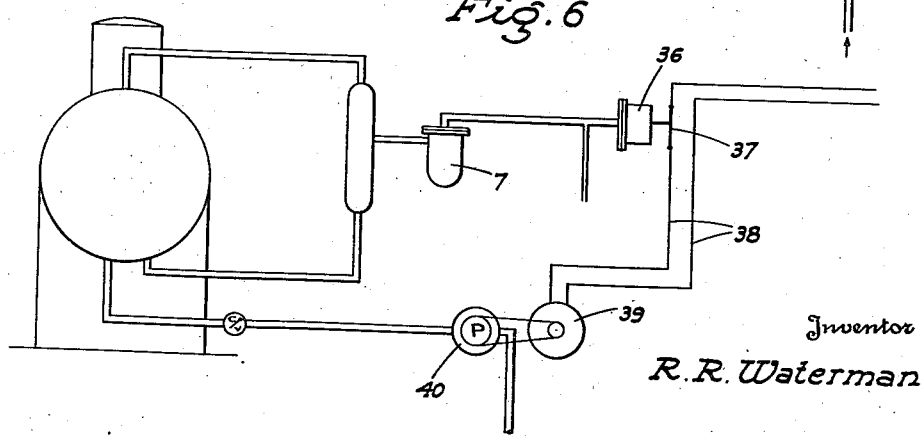

Figures 4, 5, and 6 are diagrams of the system as operating with different forms of water feed devices.

Referring now more particularly to the characters of reference on the drawings, this system as here illustrated, and as applied to a conventional or any other type boiler 1, includes a water column 2 or its equivalent connected to the boiler above and below water level by steam and water pipes 3 and 4 respectively.

Another pipe 5 is connected to the column 2 just above high water level line 6 in the column (and of course in the boiler also), said pipe leading to a steam trap 7. This trap may be of any suitable type and as here shown comprises a steam-tight body 8 to which the pipe 5 is connected, and having an outlet passage 9 which depends into the trap float 10; said float having a valve 11 which closes the outlet 9 when the float is up and is supported by water in the normal level. The outlet 9 is connected by a pipe 12 to a pressure controlled valve 13 of any suitable type. As here shown this valve comprises a body 14 having a pressure intake 15 in one end

2 to which the pipe 12 is connected and a steam intake 16 in its opposite end. A valve 17 is slidably mounted in the body in position to close the intake 16, said valve having an enlarged head 18 and being normally pressed in the direction of the intake 15 and held open by a spring 19 in the body engaging said head. A pressure tight diaphragm 20 is mounted in the body between the head 17 and intake 15, and beyond the diaphragm the body has a steam outlet 21 normally communicating with the intake 16. The steam intake 16 is connected by a pipe 22 with the steam zone of the boiler, preferably utilizing a portion of the pipe 3 for this purpose. The outlet 21 is connected by a pipe 23 with the steam operating end 24 of a water pump 25 of any suitable type which feeds to the boiler. The water passing from the pump to the boiler preferably passes through a heater 26 which is heated by the exhaust steam from the pump, as is common practice. Another pipe 27 with a restricted valve 28 or the equivalent therein connects the pipe 12 and the exhaust steam line 29 of the pump.

In operation, as long as the water in the boiler is below normal level, steam will flow into the trap body and the float 10 is raised, holding the valve 11 closed. The pressure control valve 13 is therefore not affected and remains open, allowing steam to flow to the pump to operate the same and thus supply water to the boiler. As soon as the water level raises slightly above normal, said water flows into the trap, the latter operates in the conventional manner, and this water under pressure flows through the trap outlet 9 and pipe 12 to the pressure control valve. Here this water acts against the diaphragm 20, closing the valve 17 against the resistance of the spring 19 and thus stopping the flow of steam to the pump. The valve 17 remains closed as long as the water level in the boiler remains high enough to flow water to the trap and from the trap to the diaphragm. When this flow stops the steam pressure in the trap forces the water from the cup 10 in the conventional manner, such water gradually bleeding through the restricted valve in pipe 27 until the cup 10 is empty whereby the valve 10 closes. The valve 17 is then opened by pressure of the spring 19, any water in the pipe 12 likewise bleeding through pipe 27. The pressure control valve 13 thereupon again opens, starting the pump and again replenishing the supply of water.

In Fig. 4, I show the system as operating with a constant-pressure water supply line, such as a water pipe tapping a city main. In this case, the pressure controlled valve 13 is interposed directly in the water pipe 30 leading from the pressure source to the boiler, the valve being open when the water is relatively low in the boiler.

In Fig. 5 I show the system as applied to the bypass 31 of a pressure-tank 32, to which water is supplied by a constant speed pump 33. In this case, the bypass 31 is connected at one end to the water feed pipe 34 leading from the tank to the boiler; the other end of the bypass leading from said one end back to the tank. The pressure controlled valve 35 is interposed in the bypass and is arranged so as to close the same when the water in the boiler is low, and to open the bypass so that the flow from the tank will pass therethrough, instead of to the boiler, when the water is high in the boiler.

In Fig. 6, the pressure controlled unit 36 actuates an electric switch 37 interposed in the circuit 38 of an electric motor 39 which operates the water feed pump 40; the switch being closed and the motor and pump consequently operating when the water level in the boiler is low.

In each instance of course the steam trap 7 is the initial and essential controlling factor in the operation of the system.

Having thus described my invention, what I claim as new and useful and desire to secure by Letters Patent is:

1. In combination, a boiler having a predetermined normal water level, a pump for delivering water to the boiler, a steam line leading to the pump for operating the latter, a valve casing in the steam line having an inlet and an outlet in communication with said steam line, a spring pressed valve within the casing for establishing communication between said inlet and outlet, the spring of the valve tending to normally hold the valve open, a resilient diaphragm in the casing extending across the casing in normal contact with the stem of the valve, the casing having an inlet to the interior thereof on the side of the diaphragm opposite to the side thereof which is in contact with the valve stem, a steam trap, the inlet side of the trap being in communication with the steam line and with the boiler, a pipe leading from the outlet side of the trap to the last named inlet in the casing, the trap functioning upon a rise of water in the boiler above the predetermined level to pass water through such pipe to and into the casing against the diaphragm to thereby close the valve, and a restricted outlet from the pipe between the trap and the casing.

2. In combination, a boiler having a predetermined normal water level, means to supply water to the boiler, a casing, a resilient diaphragm extending across the casing, the casing having an inlet into the same at one side of the casing, a steam trap, the inlet side of the trap being in communication with the boiler, a pipe leading from the outlet side of the trap to the inlet in said casing, the trap functioning upon a rise of water in the boiler above the predetermined level to pass water through such pipe to and into the casing and against the diaphragm to distend the same, means interposed between the diaphragm and the water supply means to the boiler and responsive to movements of said diaphragm to control the amount of water delivered to the boiler by such supply means, there being a restricted outlet from the pipe leading from the trap to the casing.

RUSSELL R. WATERMAN.

REFERENCES CITED

The following references are of record in the file of this patent:

UNITED STATES PATENTS

| Number | Name | Date |
| --- | --- | --- |
| 1,781,749 | Davin | Nov. 18, 1930 |